United States Patent
Lombard et al.

(10) Patent No.: US 9,512,733 B2
(45) Date of Patent: Dec. 6, 2016

(54) DIFFUSER/RECTIFIER ASSEMBLY FOR A TURBINE ENGINE WITH CORRUGATED DOWNSTREAM WALLS

(75) Inventors: Jean-Pierre Francois Lombard, Pamfou (FR); Eric Mercier, Paris (FR); Francois Pierre Georges Maurice Ribassin, Villabe (FR)

(73) Assignee: SNECMA, Paris (FR)

( * ) Notice: Subject to any disclaimer, the term of this patent is extended or adjusted under 35 U.S.C. 154(b) by 1249 days.

(21) Appl. No.: 13/148,214

(22) PCT Filed: Oct. 21, 2009

(86) PCT No.: PCT/FR2009/001230
§ 371 (c)(1),
(2), (4) Date: Oct. 14, 2011

(87) PCT Pub. No.: WO2010/089466
PCT Pub. Date: Aug. 12, 2010

(65) Prior Publication Data
US 2012/0018543 A1    Jan. 26, 2012

(30) Foreign Application Priority Data
Feb. 5, 2009   (FR) ...................................... 09 00494

(51) Int. Cl.
 *F01D 9/04*  (2006.01)
 *F02C 3/14*  (2006.01)
 (Continued)

(52) U.S. Cl.
 CPC ................. *F01D 9/041* (2013.01); *F02C 3/14* (2013.01); *F04D 29/444* (2013.01); *F23R 3/04* (2013.01); *F04D 29/44* (2013.01); *F05D 2250/52* (2013.01); *Y02T 50/671* (2013.01)

(58) Field of Classification Search
 CPC .......... F01D 5/14; F01D 9/041; F01D 9/042; F01D 9/045; F04D 29/44; F04D 29/441; F04D 29/444; F23R 3/04
 USPC .......... 60/751, 770; 415/208.2–208.4, 211.1, 415/211.2, 207, 209.4, 210.1; 181/213, 181/220; 239/127.3
 See application file for complete search history.

(56) References Cited

U.S. PATENT DOCUMENTS

| | | | |
|---|---|---|---|
| 3,079,068 A |   | 2/1963 | Williams et al. |
| 3,719,430 A | * | 3/1973 | Blair ............................. 415/207 |
| 3,788,065 A | * | 1/1974 | Markowski ............... F23R 3/34 |
| | | | 431/173 |

(Continued)

FOREIGN PATENT DOCUMENTS

| | | |
|---|---|---|
| EP | 1 995 410 | 11/2008 |
| GB | 669357 A | 4/1952 |
| GB | 2 281 356 | 3/1995 |

OTHER PUBLICATIONS

International Search Report issued Jan. 13, 2010 in PCT/FR09/01230 filed Oct. 21, 2009.

(Continued)

*Primary Examiner* — Gerald L Sung
*Assistant Examiner* — Thomas Burke
(74) *Attorney, Agent, or Firm* — Oblon, McClelland, Maier & Neustadt, L.L.P.

(57) ABSTRACT

A diffuser-nozzle assembly for mounting at an outlet from a compressor in a turbomachine, the assembly including a nozzle including two substantially cylindrical walls, a radially inner wall and a radially outer wall that are connected together by radial vanes. The walls of the nozzle are extended downstream beyond the radial vanes and the radial spacing therebetween varies downstream from the vanes to be at a minimum substantially in register with the vanes and at a maximum between the vanes.

11 Claims, 5 Drawing Sheets

(51) Int. Cl.
*F23R 3/04* (2006.01)
*F04D 29/44* (2006.01)

(56) References Cited

U.S. PATENT DOCUMENTS

| | | | | |
|---|---|---|---|---|
| 3,879,939 | A | * | 4/1975 | Markowski ............ 60/751 |
| 4,117,671 | A | | 10/1978 | Neal et al. |
| 4,677,828 | A | | 7/1987 | Matthews et al. |
| 5,466,123 | A | | 11/1995 | Rose |
| 5,592,820 | A | * | 1/1997 | Alary ............ F01D 9/02 60/751 |
| 6,471,475 | B1 | | 10/2002 | Sasu et al. |
| 6,606,854 | B1 | * | 8/2003 | Siefker ............ B63G 13/02 181/213 |
| 6,935,098 | B2 | * | 8/2005 | Bardagi ............ F02K 1/48 181/213 |
| 2006/0010852 | A1 | * | 1/2006 | Gekht ............ B23K 15/0093 60/262 |
| 2007/0183890 | A1 | * | 8/2007 | Nolcheff et al. ............ 415/191 |
| 2009/0053066 | A1 | | 2/2009 | Iida |

OTHER PUBLICATIONS

French Search Report issued Jun. 30, 2009 in French Application No. 0900494 filed Feb. 5, 2009.
Combined Chinese Office Action and Search Report issued Sep. 27, 2013 in Patent Application No. 200980156298.2 (with English language translation and English Translation of Category of Cited Documents).

* cited by examiner

DIFFUSER/RECTIFIER ASSEMBLY FOR A TURBINE ENGINE WITH CORRUGATED DOWNSTREAM WALLS

BACKGROUND OF THE INVENTION

1. Field of the Invention

The invention relates to a diffuser-nozzle assembly for feeding air to an annular combustion chamber in a turbomachine such as an airplane turboprop or turbojet or a helicopter engine.

2. Description of the Related Art

In a conventional embodiment, a turbomachine has an annular combustion chamber that is fed with air by a high pressure compressor arranged upstream therefrom. The outlet from the compressor is connected via an axial or radial diffuser that is connected to a nozzle comprising substantially radial vanes at the inlet to the combustion chamber, which is itself mounted in an annular enclosure defined externally by an outer casing. Fuel is delivered via injectors to the annular end wall of the chamber, which injectors are regularly spaced apart and carried by the outer casing.

The performance of the combustion chamber depends to a very great extent on the performance of the injector system, which contributes to atomizing the fuel, i.e. to dispersing it in the form of fine droplets, and thereby serves to stabilize the combustion of the fuel by forming a recirculation zone. Fuel atomization is encouraged by a large head loss for the air in the injector system, and control over the recirculation zone is enhanced by feeding air uniformly to the injector system.

These criteria are difficult to satisfy when the outlet from the compressor comprises a diffuser-nozzle assembly of the axial type or of the centrifugal type, i.e. a radial diffuser and an annular nozzle.

At the outlet from the nozzle, it is observed that the Mach number downstream from the vanes is much lower substantially in line with the vanes than it is between the vanes. The flow of air at the outlet from the nozzle thus presents a Mach number with circumferential non-uniformities, thereby leading to an effective Mach number that differs from the Mach number corresponding to a flow that is uniform. This gives rise to large head losses when feeding the injector system and to distortions in the feed provided by the system, thereby running the risk of affecting the stability of combustion.

In order to minimize the impact of circumferential non-uniformities in the speed of air at the outlet from the nozzle, it is known to control the distance between the trailing edges of the vanes of the nozzle and the upstream end of the injector system as a function of the angle of orientation of the air stream.

Application FR 08/01063 in the name of the Applicant proposes a flared section downstream from the vanes of the nozzle in order to reduce the mean Mach number and reduce the circumferential non-uniformities in the Mach number of the air stream at the inlet to the combustion chamber.

Nevertheless, those known means do not enable a satisfactory solution to be provided to the problem of the Mach number being smaller in the wakes of the vanes of the nozzle.

BRIEF SUMMARY OF THE INVENTION

A particular object of the invention is to provide a solution to this problem that is simple, inexpensive, and effective.

To this end, the invention provides a diffuser-nozzle assembly for mounting at the outlet from a compressor in a turbomachine, the assembly comprising a nozzle having two substantially cylindrical walls, a radially inner wall and a radially outer wall that are connected together by radial vanes, the assembly being characterized in that the walls of the nozzle are extended downstream beyond the radial vanes and the radial spacing therebetween varies circumferentially downstream from the vanes in such a manner as to be at a minimum substantially in register with the vanes and at a maximum between the vanes.

Minimizing the radial spacing between the inner and outer walls of the nozzle in register with the vanes and downstream therefrom serves to accelerate the air stream locally in the wakes of the vanes as compared to the air stream that passes between the vanes. The difference of air speed in register with the vanes compared with the air speed between the vanes is thus decreased, thereby decreasing the circumferential non-uniformities of air speed at the outlet from the nozzle. The air stream feeding the injector system is thus more uniform, thus making it possible to achieve good control over the formation of the recirculation zone in order to ensure stable combustion and reduce the head loss in the feed to the injector system.

This improvement in the uniformity with which the injector system is fed makes it possible to reduce the distance between the vanes of the nozzle and the injector system, thereby enabling the weight of the turbomachine to be reduced.

According to another characteristic of the invention, the radial spacing downstream from the vanes varies circumferentially to the downstream ends of the downstream walls of the nozzle, thereby reducing circumferential non-uniformities in the speed of the air stream at the outlet from the nozzle.

The walls of the nozzle may diverge downstream from the vanes, thereby reducing the mean Mach number, and thus further reducing non-uniformities in the stream of air feeding the injector system.

According to another characteristic of the invention, at least one of the walls of the nozzle is corrugated or crenellated downstream from the vanes.

In a variant of the invention, both walls of the nozzle may be corrugated or crenellated downstream from the vanes.

The corrugations of the downstream portion(s) of the wall(s) of the nozzle may be symmetrical or asymmetrical relative to radial planes extending the vanes.

When the walls are asymmetrical, the corrugations may extend helically around the axis of the compressor with a helix angle corresponding to a residual angle of gyration or to a separation angle of the air stream at the outlets from the vanes of the nozzle. When the air stream at the outlet from the vanes presents a separation from the walls of the vanes of the nozzle, the helix angle may correspond to the separation angle of the air stream, with the radial spacing between the downstream walls of the nozzle being at a minimum in this direction.

By way of example, the corrugations of the downstream portions of the walls of the nozzle are sinusoidal, crenellated, in the form of circular arcs, or in the form of V-shapes.

The corrugations of the downstream walls of the nozzle may be identical or of the same type for both walls, or of a type that differs from one wall to the other.

The nozzle may be a single piece or else it may be made by welding or machine brazing.

The invention also provides a turbomachine, such as a turbojet, a turboprop, or a helicopter engine, characterized in that it includes a diffuser-nozzle assembly of the above-described type.

BRIEF DESCRIPTION OF THE SEVERAL VIEWS OF THE DRAWINGS

The invention can be better understood and other details, advantages, and characteristics of the invention appear on reading the following description made by way of non-limiting example and with reference to the accompanying drawings, in which.

DETAILED DESCRIPTION OF THE INVENTION

Figure 1:
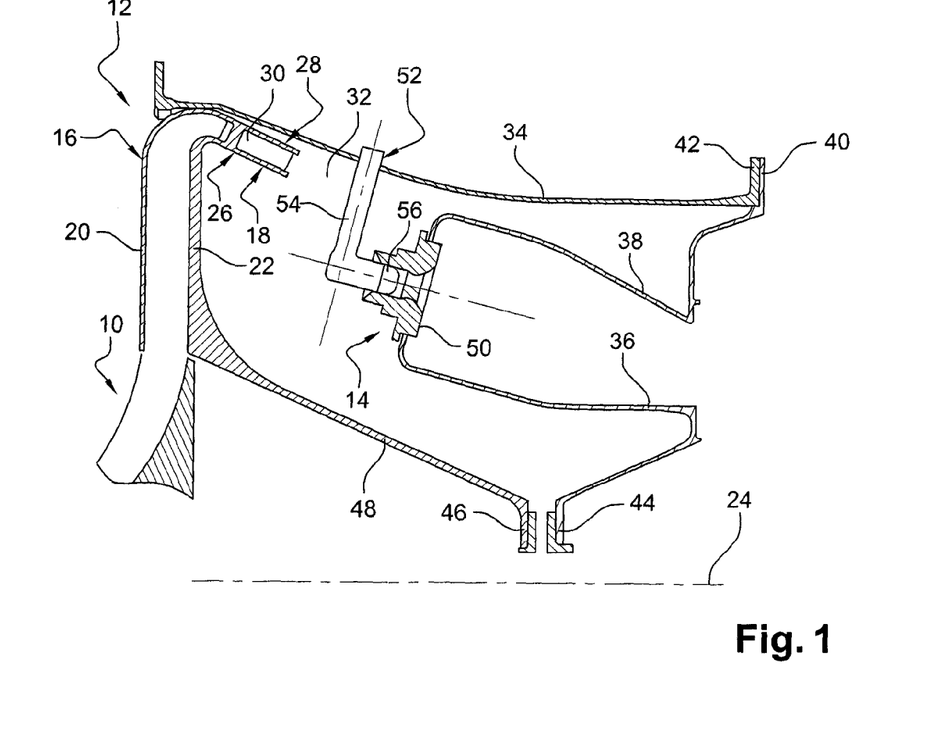
FIG. 1 is a diagrammatic half-view in axial section of a centrifugal diffuser-nozzle assembly and of a combustion chamber in a prior art turbomachine.

Reference is made initially to FIG. 1, which shows a portion of a turbomachine, such as an airplane turboprop or turbojet or a helicopter engine, which comprises from upstream to downstream in the flow direction of gas through the turbomachine: the outlet from a centrifugal compressor stage 10; a diffuser-nozzle assembly 12 bent into an L-shape; and an annular combustion chamber 14.

The diffuser-nozzle assembly 12 comprises a substantially radial upstream annular portion 16 forming the diffuser that is connected at its outer periphery to a frustoconical or cylindrical downstream annular portion forming the nozzle 18.

The diffuser 16 has an upstream annular wall 20 and a downstream annular wall 22, which walls are parallel and extend radially around the axis of rotation 24 of the turbomachine.

The nozzle comprises two frustoconical walls that are substantially parallel, an inner wall 26 and an outer wall 28 that converge downstream and that are connected together by a plurality of substantially radial vanes 20 that are regularly distributed around the axis 24 of the turbomachine.

The inlet of the diffuser 16 is in radial alignment with the outlet from the last stage 10 of the high pressure compressor, and the outlet from the nozzle 18 feeds air to an annular enclosure 32 defined on the outside by an outer casing 34 and containing the combustion chamber 14. The chamber 14 is generally annular in shape and comprises two coaxial walls 36 and 38 forming surfaces of revolution that lie one inside the other.

The outer wall 38 of the chamber includes a radially outer annular flange 40 at its downstream end for fastening to an annular flange 42 of the outer casing 34. The inner wall 36 of the chamber 14 includes a radially inner annular flange 44 at its downstream end for fastening to an annular flange 46 provided at the downstream end of a downstream annular web 48 for supporting the diffuser-nozzle assembly 12. The upstream end of the web 48 is connected to the downstream annular wall 22 of the diffuser 16.

The annular end wall of the chamber 14 includes orifices for mounting injector means 50 for injecting a mixture of air and fuel into the chamber 14, the air coming from the diffuser-nozzle assembly 12, and the fuel being conveyed by injectors 52 fastened to the outer casing 34 and regularly distributed around the axis 24 of the turbomachine.

Each injector 52 includes a duct 54 that extends inwards from the outer casing 34 and that is connected to an injection head 56 that extends downstream in the injector system 50.

The flow of air leaving the nozzle presents circumferential non-uniformities of speed as a result of a drop in the Mach number in the wakes of the vanes 30. These non-uniformities give rise to localized head losses in the wakes downstream from the vanes, they do not allow the injector system being fed uniformly, and they penalize combustion stability.

The invention enables the flow of air downstream from the vanes 30 of the nozzle 18 to be made uniform by means of inner and outer downstream walls of the nozzle 18 downstream from the vanes 30 that are radially spaced apart in a manner that varies circumferentially so as to be at a minimum substantially in register downstream with the vanes 30 and at a maximum between the vanes 30. This radial spacing varies circumferentially from the trailing edges of the vanes to the downstream ends of the inner and outer downstream walls of the nozzle.

Figure 2:
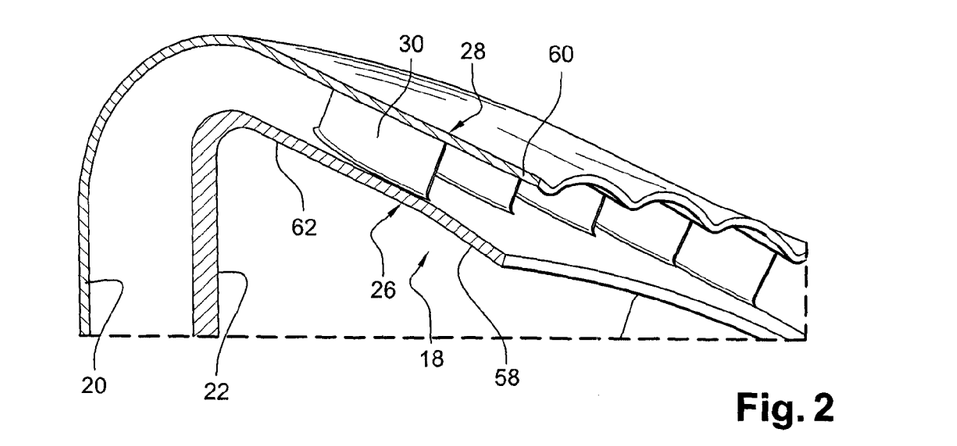
FIG. 2 is a diagrammatic perspective view of a diffuser-nozzle assembly in a first embodiment of the invention.

As shown in FIG. 2, the inner and outer walls 26 and 28 are extended downstream from the vanes 30 by respective inner and outer downstream walls 58 and 60. The outer downstream wall 60 is corrugated with circularly arcuate corrugations having their concave sides facing towards the axis of the turbomachine. The inner downstream wall 58 of the nozzle 18 slopes inwards and diverges relative to the outer downstream wall 60 of the nozzle 18.

The number of circular arcs in the outer downstream wall 60 is equal to the number of radial vanes 30 in the nozzle 18. The circular arcs are formed in such a manner that the middle portion of each circular arc lies halfway between the vanes while the circumferential ends thereof are situated in register with the vanes 30 and downstream therefrom. In this way, the radial spacing between the inner downstream wall 58 and the outer downstream wall 60 is at a minimum in register with the vanes 30 and downstream therefrom, i.e. in the wakes of the vanes, and at a maximum between the vanes 30.

Furthermore, the amplitude of the corrugations in the outer downstream wall 60 increases going from the trailing edges of the vanes 30 to the outlet from the nozzle 18.

Figure 3:
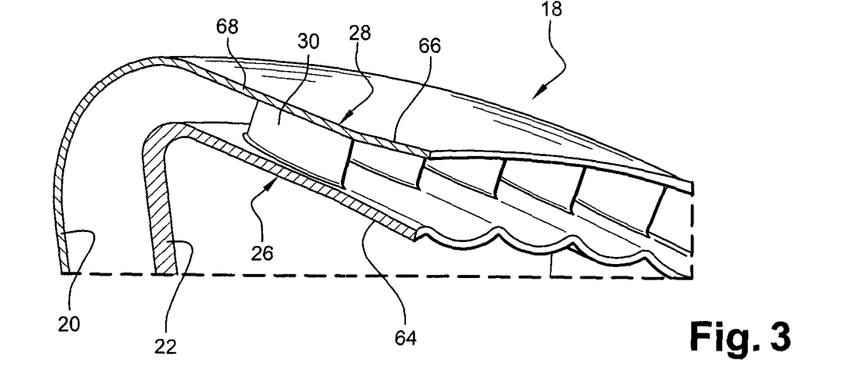
FIGS. 3 to 13 are diagrammatic perspective or end views of various embodiments of the invention.

In another embodiment shown in FIG. 3, the inner downstream wall 64 of the nozzle 18 includes circularly arcuate corrugations, and the outer downstream portion 66 diverges radially outwards relative to the inner downstream wall 64 of the nozzle 18. In order to guarantee a minimum radial spacing in register with the vanes 30 and downstream therefrom, the circularly arcuate corrugations have their concave sides facing radially outwards.

Figure 4:
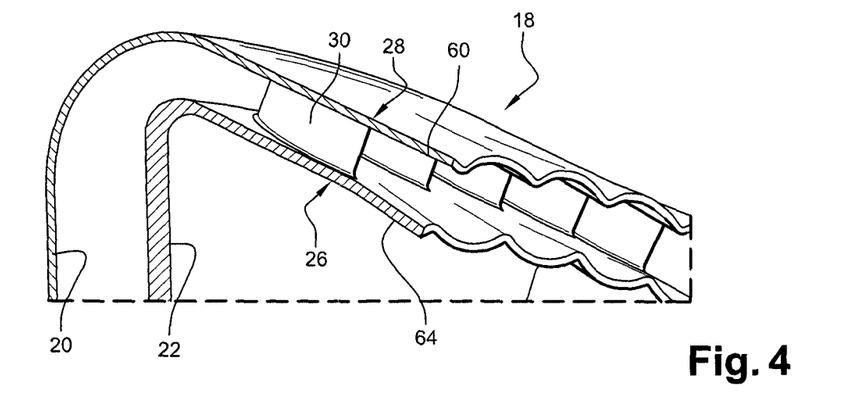
Figure 5:
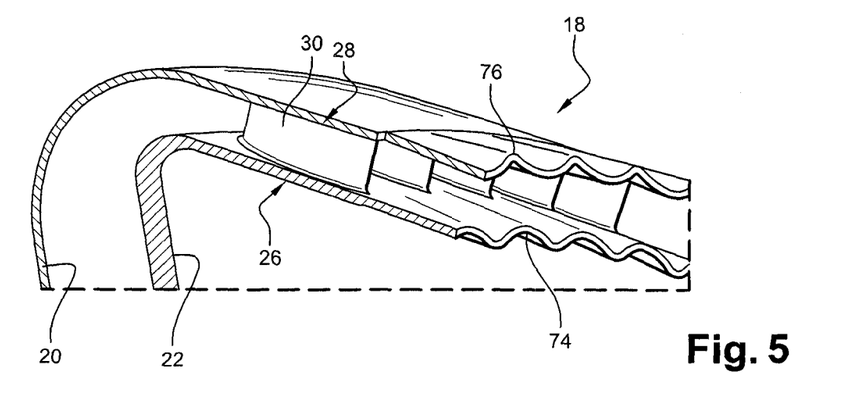

FIGS. 4 and 5 show two other embodiments of the invention in which the inner and outer downstream walls of the nozzle 18 have corrugations that are of the same type and that are circularly arcuate. The embodiment of FIG. 4 corresponds to combining the outer downstream wall 60 of the nozzle 18 in FIG. 2 with the inner downstream wall 64 of the nozzle 18 in FIG. 3. In FIG. 5, the concave sides of the corrugations of the inner and outer downstream walls 74 and 76 face respectively radially inwards and radially outwards. The middle portion of each circular arc is situated in register with the vanes 30 and downstream therefrom, while the ends of each circular arc are situated halfway between the vanes 30, so as to guarantee a minimum radial spacing between the downstream walls 74 and 76 of the nozzle 18 in the wakes of the vanes 30.

Figure 6:
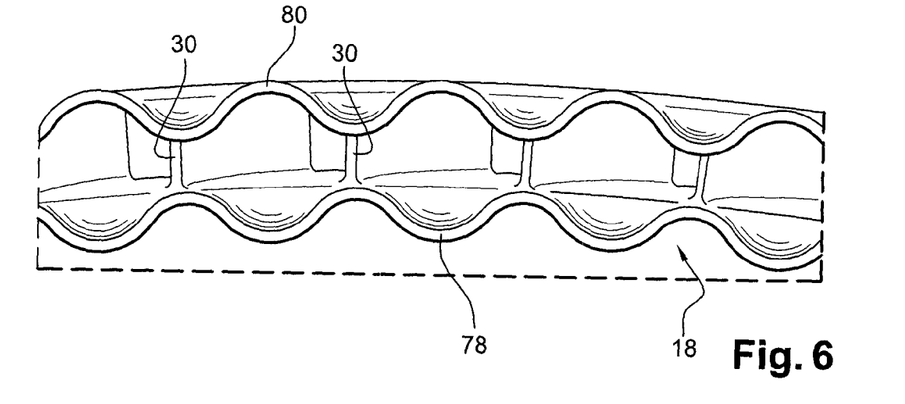
Figure 7:
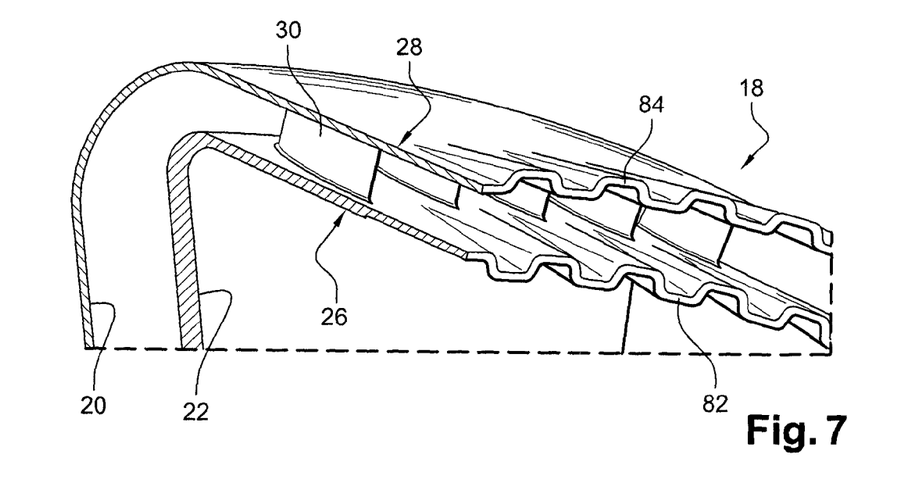
Figure 8:
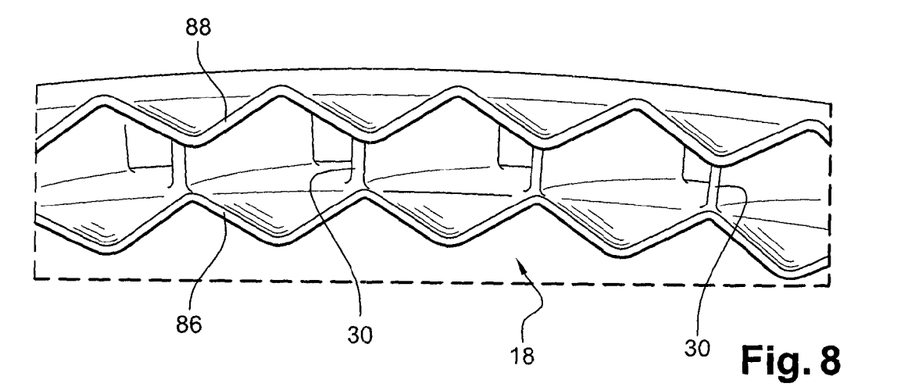

FIGS. 6 to 8 show other possible embodiments of the invention. In FIG. 6, the inner and outer downstream walls 78, 80 of the nozzle 18 are sinusoidal. In FIG. 7, the downstream walls 82, 84 of the nozzle 18 are crenellated, and in FIG. 8, the downstream walls 86, 88 are formed by a succession of V-shapes that are connected to one another.

In the embodiments of FIGS. 5 to 8, the inner and outer downstream walls of the nozzle 18 are symmetrical about a surface of revolution situated halfway between these downstream walls of the nozzle.

Figure 9:
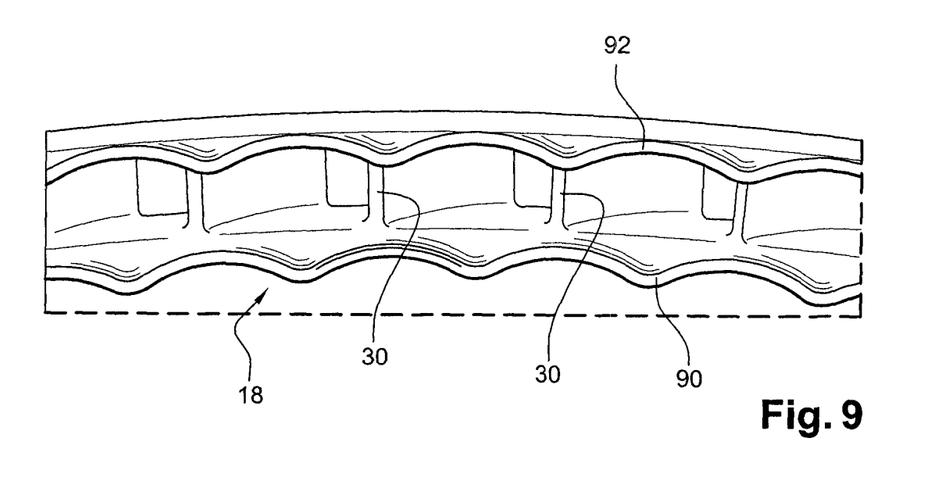

Nevertheless, and as shown in FIG. 9, it is possible to have inner and outer downstream walls 90 and 2C) 92 of the nozzle 18 that are not symmetrical to each other. As shown, the inner downstream walls 90 and the outer downstream walls 92 both comprise circularly arcuate corrugations having their concave sides facing inwards. In order to ensure that the radial spacing between the inner and outer downstream walls 90 and 92 is at a minimum in register with the vanes 30 and downstream therefrom, the inner downstream wall 90 of the nozzle is angularly offset relative to the outer downstream wall 92 of the nozzle 18 through an angle that is equal to half the angular extent of one of the circular arcs. Thus, the ends of the circular arcs of the inner downstream wall 90 are halfway between the vanes 30, and the ends of the circular arcs of the outer downstream wall 92 are in register with the vanes 30, downstream therefrom.

By causing the radial spacing between the inner and outer downstream walls of the nozzle 18 to vary, the streams of air in the wakes of the vanes 30 are caused to accelerate so as to compensate for their speed deficit due to the presence of the vanes. The supply of air to the injector system is thus made uniform, thereby ensuring that the fuel is well atomized, encouraging stable combustion, and limiting the emission of pollutants.

In the above-described embodiments, the corrugated or crenellated inner and outer downstream walls of the nozzle are symmetrical about radial planes extending the vanes downstream or passing halfway between the vanes.

Figure 10:
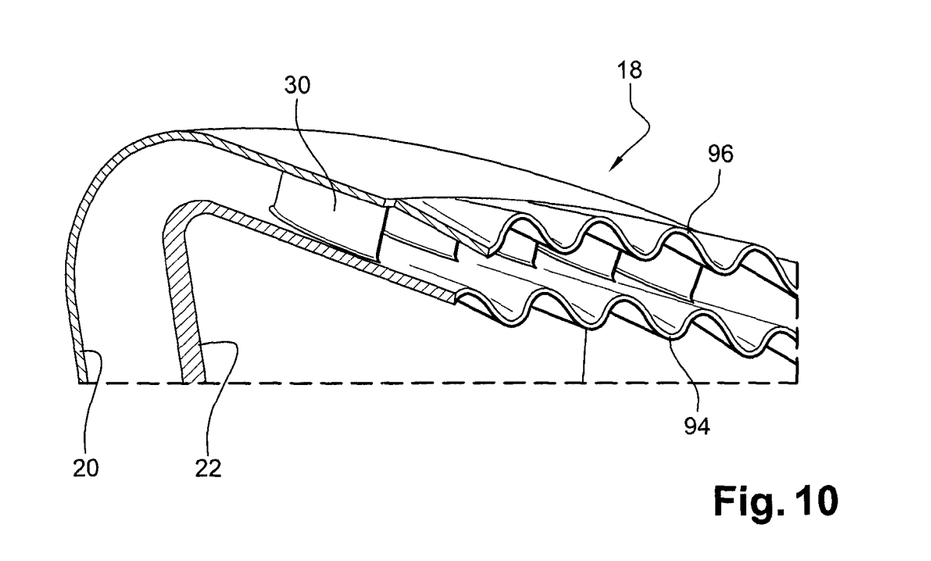
Figure 11:
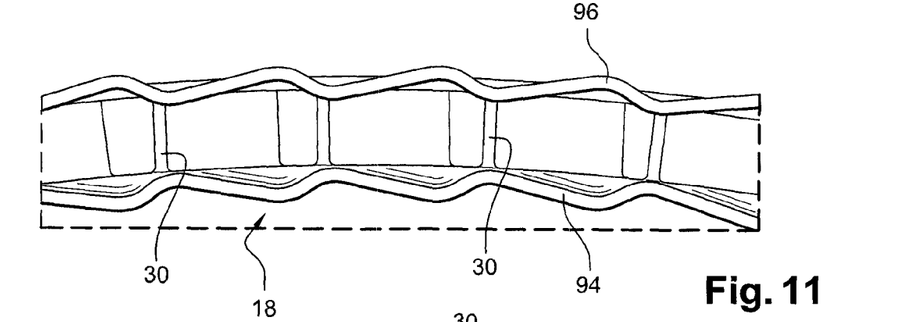
Figure 12:
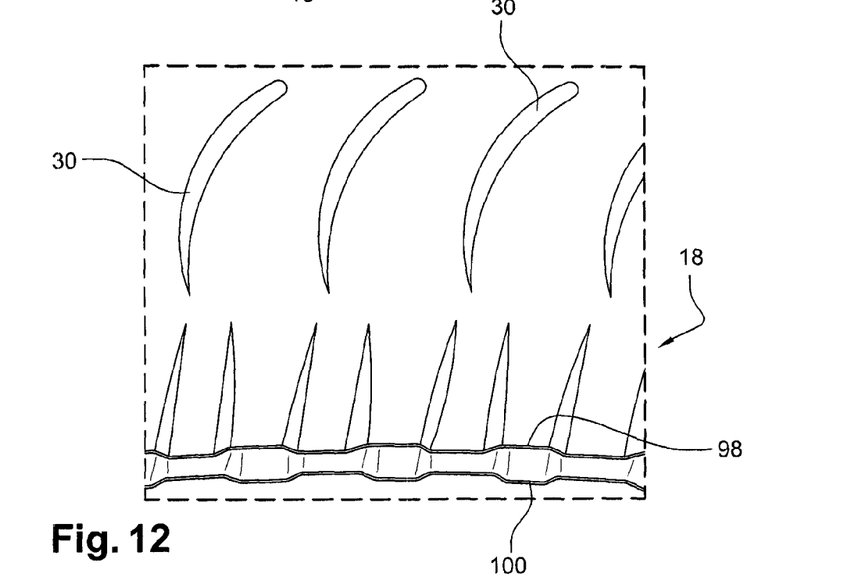

In certain circumstances, the air stream leaving the nozzle includes a gyratory component, such that the air flows in a direction that is at an angle with the axis of the turbomachine. It is possible to guide the air stream leaving the nozzle better by making corrugated or crenellated downstream walls that are asymmetrical relative to radial planes extending the vanes downstream (FIGS. 10 to 12). FIG. 10 shows corrugated inner and outer downstream walls 94, 96 of the nozzle that are asymmetrical relative to the above-mentioned radial planes. In the variant of FIG. 11, the corrugations of the inner and outer downstream walls 94, 96 are formed by a succession of asymmetrical V-shapes that are connected to one another. Each V-shaped portion is formed by a first branch connected at the top of the V-shape to a second branch that is shorter than the first branch. The ends of each V-shaped portion are connected in the zone that lies in register with the vanes of the nozzle and downstream therefrom, and the vertices of each V-shaped portion in the inner and outer downstream walls are oriented radially inwards and outwards, respectively.

These configurations serve to localize as much as possible the radial spacing between the inner and outer downstream walls of the nozzle so that they are not situated in the middle of the inter-vane space in the downstream portion of the nozzle but so that they are offset circumferentially relative to said middle position, with the radial spacing minimum remaining situated in register with the vanes and downstream therefrom.

In the variant embodiment of FIG. 12, the corrugations or crenellations 98, 100 of the downstream walls of the nozzle extend helically around the axis of the compressor with a helix angle corresponding to the residual angle of gyration at the outlets from the vanes 30 of the nozzle 18.

When the air stream leaving the vanes presents separation from the walls of the vanes of the nozzle, the helix angle may correspond to the separation angle of the air stream, the radial spacing between the downstream walls of the nozzle being at a minimum in this direction.

Figure 13:
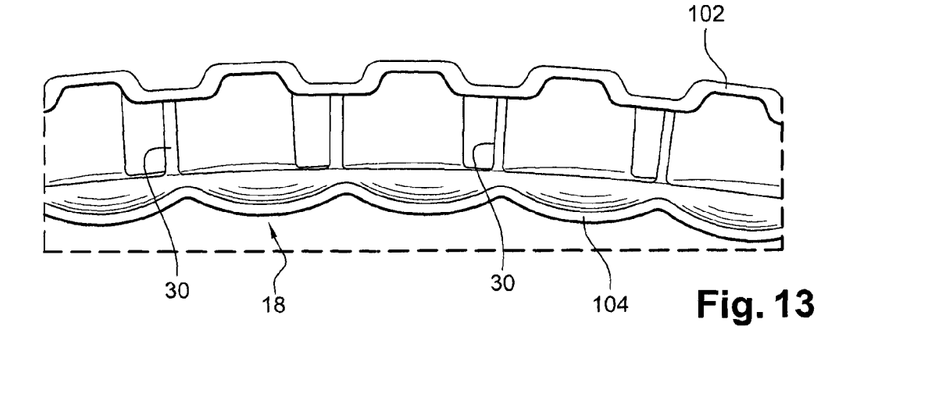

Numerous variants of the invention are possible, and in particular it is possible to combine inner and outer downstream walls that are of the same type, i.e. crenellated, in circular arcs, in V-shapes, or sinusoidal, as shown in the drawings, or instead it is possible to combine inner and outer downstream walls that are of different types, e.g. an outer downstream wall 102 having crenellations together with an inner downstream wall 104 having circular arcs (FIG. 13).

In the embodiments of FIGS. 2 and 3, the outer or inner downstream wall 60 or 64 that does not have corrugations may extend the inner upstream wall 62 or the outer upstream wall 68 of the nozzle 18, respectively, without being inclined relative thereto.

The inner and outer downstream walls may be formed integrally with the inner and upper upstream walls of the nozzle 18, or they may be welded or machined brazed to said upstream walls.

In a particular embodiment of a diffuser-nozzle assembly of the invention, the length of the downstream walls of the nozzle 18 may be as much as about 50 millimeters.

Although the above description is given with reference to a centrifugal diffuser-nozzle assembly, the invention may also be used with a diffuser-nozzle assembly in which the diffuser is axial and arranged at the outlet from a last compression stage that is likewise axial.

It is possible to perform calculations or three-dimensional measurements of the air flow at the outlet from the vanes of the nozzle, specifically for the purpose of adapting the three-dimensional shapes of the inner and outer downstream walls of the nozzle and their positioning downstream from the air-flow vanes.

In certain embodiments, such as those shown in FIGS. 5 to 13, the radial spacing between the inner and outer downstream walls of the nozzle is constant downstream from the vanes to the downstream ends of the downstream walls of the nozzle, whereas in the portion situated between two consecutive vanes, the radial spacing increases progressively to the downstream ends of the downstream walls of the nozzle.

The invention claimed is:

1. A turbomachine comprising:
a diffuser-nozzle assembly mounted at an outlet from a compressor; and
an annular combustion chamber mounted downstream of the diffuser-nozzle assembly,
the diffuser-nozzle assembly comprising:
a nozzle including two substantially cylindrical walls that are a radially inner wall and a radially outer wall that are connected together by radial vanes which are distributed circumferentially,
wherein a circumferential shape of a portion of at least one of the radially inner wall and the radially outer wall downstream of the radial vanes varies circumferentially between the radial vanes, the circumferential shape of the portion of the at least one of the radially inner wall and the radially outer wall downstream of the radial vanes repeating such that a radial spacing between the radially inner wall and the radially outer wall varies circumferentially so as to be at a minimum at a circumferential location substantially in register with the radial vanes and at a maximum at a circumferential location between the radial vanes.

2. The turbomachine according to claim 1, wherein the two substantially cylindrical walls of the nozzle diverge going downstream from the radial vanes.

3. The turbomachine according to claim 1, wherein at least one of the two substantially cylindrical walls of the nozzle is corrugated or crenellated downstream from the radial vanes.

4. The turbomachine according to claim 1, wherein both substantially cylindrical walls of the nozzle is corrugated or crenellated downstream from the radial vanes.

5. The turbomachine according to claim 3, wherein the corrugations of the downstream portion of at least one of the substantially cylindrical walls of the nozzle are symmetrical relative to radial planes extending from the radial vanes.

6. The turbomachine according to claim 3, wherein the corrugations of the downstream portion of at least one of the substantially cylindrical walls of the nozzle are asymmetrical relative to radial planes extending from the radial vanes.

7. The turbomachine according to claim 6, wherein the corrugations extend helically around an axis of the compressor.

8. The turbomachine according to claim 4, wherein the corrugations of the downstream portions of the two substantially cylindrical walls of the nozzle are sinusoidal, crenellated, in a form of circular arcs, or in a form of V-shapes.

9. The turbomachine according to claim 4, wherein the corrugations of the downstream portions of the two substantially cylindrical walls of the nozzle are identical or of a same type for both substantially cylindrical walls, or of a type that differs from one substantially cylindrical wall to the other substantially cylindrical wall.

10. The turbomachine according to claim 1, wherein the nozzle is a single piece or is assembled by welding or machine brazing.

11. A turbomachine comprising:

a diffuser-nozzle assembly mounted at an outlet from a compressor; and an annular combustion chamber mounted downstream of the diffuser-nozzle assembly, the diffuser-nozzle assembly comprising:

a nozzle including two substantially cylindrical walls that are a radially inner wall and a radially outer wall that are connected together by radial vanes which are distributed circumferentially, wherein a circumferential shape of a portion of at least one of the radially inner wall and the radially outer wall downstream of the radial vanes varies circumferentially between the radial vanes, the circumferential shape of the portion of the at least one of the radially inner wall and the radially outer wall downstream of the radial vanes repeating such that a radial spacing between the radially inner wall and the radially outer wall varies circumferentially downstream from the radial vanes so as to be at a minimum at a circumferential location substantially in register with the radial vanes and at a maximum at a circumferential location between the radial vanes, and both substantially cylindrical walls of the nozzle are corrugated downstream from the radial vanes.

* * * * *

UNITED STATES PATENT AND TRADEMARK OFFICE
CERTIFICATE OF CORRECTION

PATENT NO. : 9,512,733 B2
APPLICATION NO. : 13/148214
DATED : December 6, 2016
INVENTOR(S) : Jean-Pierre Francois Lombard et al.

Page 1 of 1

It is certified that error appears in the above-identified patent and that said Letters Patent is hereby corrected as shown below:

In the Specification

Column 5, Line 6, change "90 and 2C) 92 of" to --90 and 92 of--.

Signed and Sealed this
Thirteenth Day of February, 2018

Andrei Iancu
*Director of the United States Patent and Trademark Office*